United States Patent
Kloeppel et al.

[11] Patent Number: 6,121,701
[45] Date of Patent: Sep. 19, 2000

[54] SNAP ON FLEXIBLE PRINTED CIRCUIT CONNECTOR

[75] Inventors: Klaus D. Kloeppel, Watsonville; Robert M. Pelstring, Santa Cruz; Steven C. Knoche, Corralitos, all of Calif.

[73] Assignee: Seagate Technology LLC, Scotts Valley, Calif.

[21] Appl. No.: 09/060,146

[22] Filed: Apr. 14, 1998

Related U.S. Application Data

[60] Provisional application No. 60/048,242, Jun. 2, 1997.

[51] Int. Cl.[7] .................................................. H02K 11/00
[52] U.S. Cl. ............................................................ 310/71
[58] Field of Search ..................... 310/67 R, 71; 439/495, 895; 360/98.07, 99.04, 99.08

[56] References Cited

U.S. PATENT DOCUMENTS

| | | | |
|---|---|---|---|
| 5,138,209 | 8/1992 | Chuta et al. | 310/67 R |
| 5,256,922 | 10/1993 | Tanaka et al. | 310/71 |
| 5,309,181 | 5/1994 | Ota et al. | 346/145 |
| 5,313,128 | 5/1994 | Robinson et al. | 310/71 |
| 5,493,159 | 2/1996 | Norris | 310/71 |
| 5,661,352 | 8/1997 | Oguchi et al. | 310/71 |
| 5,705,866 | 1/1998 | Oguchi | 310/67 R |
| 5,705,868 | 1/1998 | Cox et al. | 310/71 |
| 5,730,619 | 3/1998 | Hamlin | 439/493 |

*Primary Examiner*—Clayton LaBalle
*Attorney, Agent, or Firm*—Flehr Hohbach Test Albritton & Herbert LLP

[57] ABSTRACT

A connector assembly comprising a base portion which plugs into the base of the motor shaft and a connector body having electrical interface rods along an axial face thereof. A flexible printed circuit having one end connected to the stator has dedicated connector pads on a surface thereof which line up with and are intended to be pressed against the molded body connector rods. To maintain the pads and rods in tight electrical contact, a connector snap spring assembly is snapped in place over the connector body. The snap spring assembly is assembled in two parts comprising a first U-shaped connector snap having a base and two arms, the arms being sized and adapted to snap over shoulders of the molded body; and a connector spring which is pressed in place over the body of the connector snap and includes a plurality of flexible fingers which are aligned with the flexible printed circuit pads and the molded body connector rods so that when the arms of the snap spring assembly are snapped over the shoulders of the body, the springlike fingers tightly press the pads and connector rods together. A hole is formed in the printed circuit axially displaced from the connector pads; a finger extending radially from the connector body passes through this hole to maintain the axial alignment of the flexible printed circuit with the remainder of the press fit connector.

2 Claims, 5 Drawing Sheets

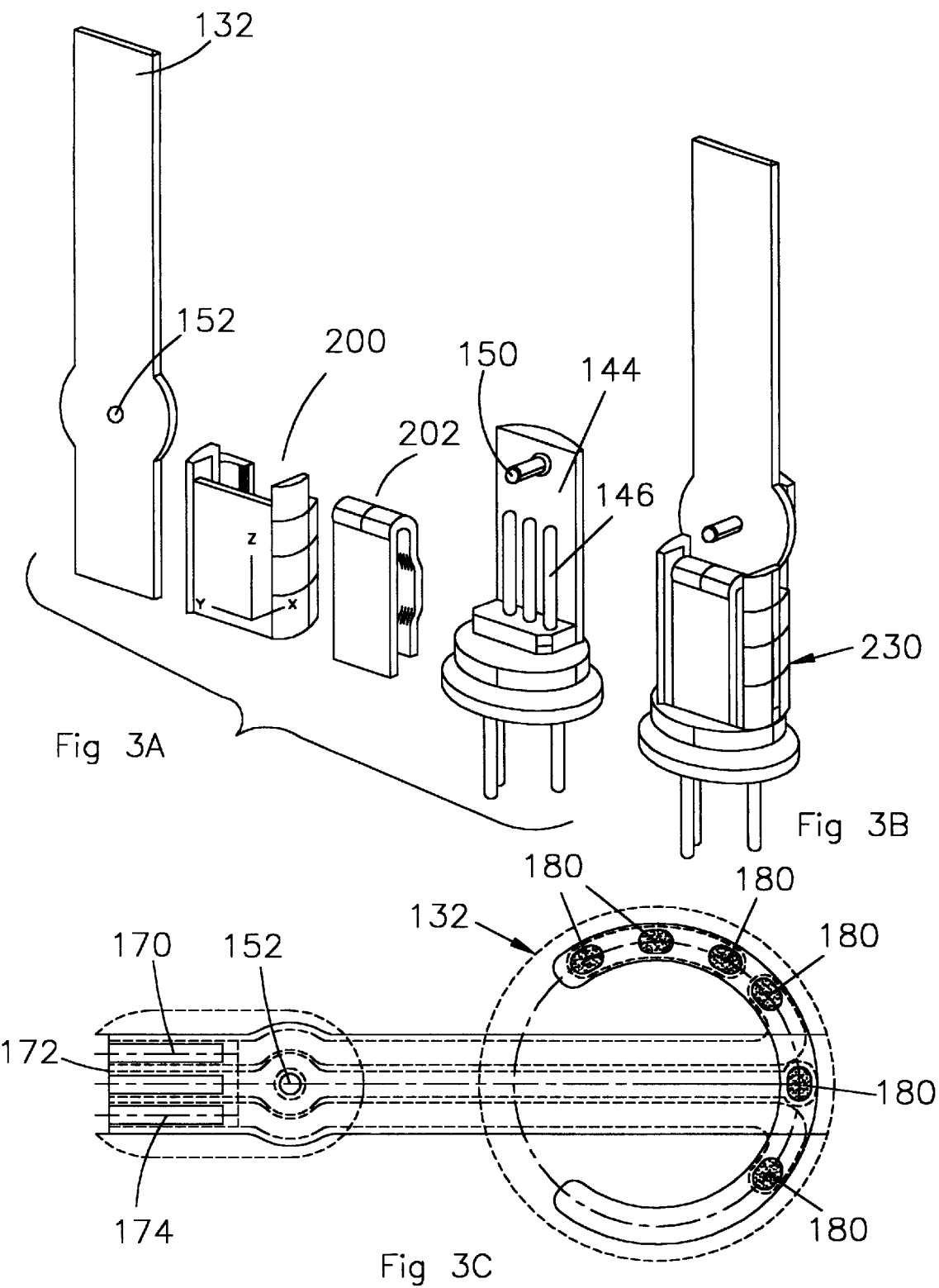

6,121,701

SNAP ON FLEXIBLE PRINTED CIRCUIT CONNECTOR

CROSS REFERENCE TO RELATED APPLICATION

This application is based on U.S. Provisional Application Ser. No. 60/048,242 filed Jun. 2, 1997, assigned to the assignee of this application and incorporated herein by reference.

FIELD OF THE INVENTION

This invention is directed generally to the field of disc drives, and more specifically for an improved electrical connector for a motor which is especially useful in disc drives.

BACKGROUND OF THE INVENTION

Winchester disc drives are being used in computers to store increasingly large amounts of information; their long term reliability as well as cost of production in an age of reduced prices for personal computers is critical. The typical Winchester disc drive is a system with a limited number of mechanical parts, including a spindle motor which mounts one or more discs for constant speed rotation, and an actuator carrying a transducer at one end and a voice coil motor at the other and operable in response to commands to the voice coil motor to position the transducer over a selected track to read and write data.

As one of the most expensive elements of a disc drive, as well as one of the largest and most mechanically complex, many design efforts are intended to minimize the cost and ease of assembly of the spindle motor. This particular invention is especially directed to improving a spindle motor design which incorporates a central connector which extends through the bottom of the shaft and into and through the base of the disc drive, so that external connections can easily be made from below the motor to a control board attached to the housing which will supply energizing current to the disc drive spindle motor. It is apparent that it is essential to provide a reliable connector from the source of external power to the stator of the spindle motor so that the motor can be reliably energized. Over time, the disc drive and the motor which runs at constant speed for hours at a time can be subjected to shock and continuing vibration; this could easily cause connections to loosen or a plug which inserts the connections into the base of the motor to even become lose and slip out of the motor, causing the disc drive to lose power. Any slippage or deterioration in the quality of the plug connector could cause such a loss of power. Therefore, an improved connector which can fit into the hollow center of a shaft and which will provide a long lifetime without deterioration of the electrical contacts is highly desirable.

SUMMARY OF THE INVENTION

Therefore, it is an object of the present invention to provide an improved spindle motor design for use in a disc drive.

A related invention is to provide a simplified spindle motor design with a reliable connector inserted into a hollow shaft of the motor.

A further objective of the invention is to provide a connector which incorporates spring contacts which establish a pressure contact between the conductive lines on the flexible printed circuit and the conductors led into the plug connector.

Another related objective of the invention is to provide a motor connector which can be easily plugged into the hollow shaft of a motor at any time during the assembly of the motor so that assembly and testing of the motor can be an optimized sequence.

A further objective of the invention is to provide a strain relief on the flexible printed circuit which is incorporated in the connector so that it cannot be disengaged from the connector.

Yet a further objective of the invention is to provide for assembly of the plug connector without the use of solder or the like, which can lead to breakage or lost contact, but rather by a press fit connection.

These and other objectives of the invention are achieved by providing a connector assembly comprising a base portion which plugs into the base of the motor shaft and a connector body having electrical interface rods along an axial face thereof. A flexible printed circuit having one end connected to the stator has dedicated connector pads on a surface thereof which line up with and are intended to be pressed against the molded body connector rods. To maintain the pads and rods in tight electrical contact, a connector snap spring assembly is snapped in place over the connector body. The snap spring assembly, for ease of manufacture, is assembled in two parts comprising a first U-shaped connector snap having a base and two arms, the arms being sized and adapted to snap over shoulders of the molded body; and a connector spring which is pressed in place over the body of the connector snap and includes a plurality of flexible fingers which are aligned with the flexible printed circuit pads and the molded body connector rods so that when the arms of the snap spring assembly are snapped over the shoulders of the body, the springlike fingers tightly press the pads and connector rods together. In order to prevent the flexible printed circuit from being pulled out from between the snap spring assembly and the body, a hole is formed in the printed circuit axially displaced from the connector pads; a finger extending radially from the connector body passes through this hole to maintain the axial alignment of the flexible printed circuit with the remainder of the press fit connector. The connection of the molded body and connector snap spring assembly is further enhanced and maintained by making their total outer dimension about the same as the width of the opening in the hollow shaft so that when the assembled connector plug is inserted in the hollow shaft, the inner walls of the shaft press the two parts of the connector together.

Other features and advantages of the present invention will be better understood by reference to the following figures and the detailed description of an exemplary embodiment or embodiments given in conjunction with these figures.

BRIEF DESCRIPTION OF THE DRAWINGS

FIG. 3A is a separated view of the four components of the present connector;

FIG. 3B is a perspective view of the components of the plug connector assembled; and FIG. 3C is a plan view of an exemplary flexible printed circuit of a type useful with the plug connector of this invention;

DETAILED DESCRIPTION OF PREFERRED EMBODIMENT

Figure 1:
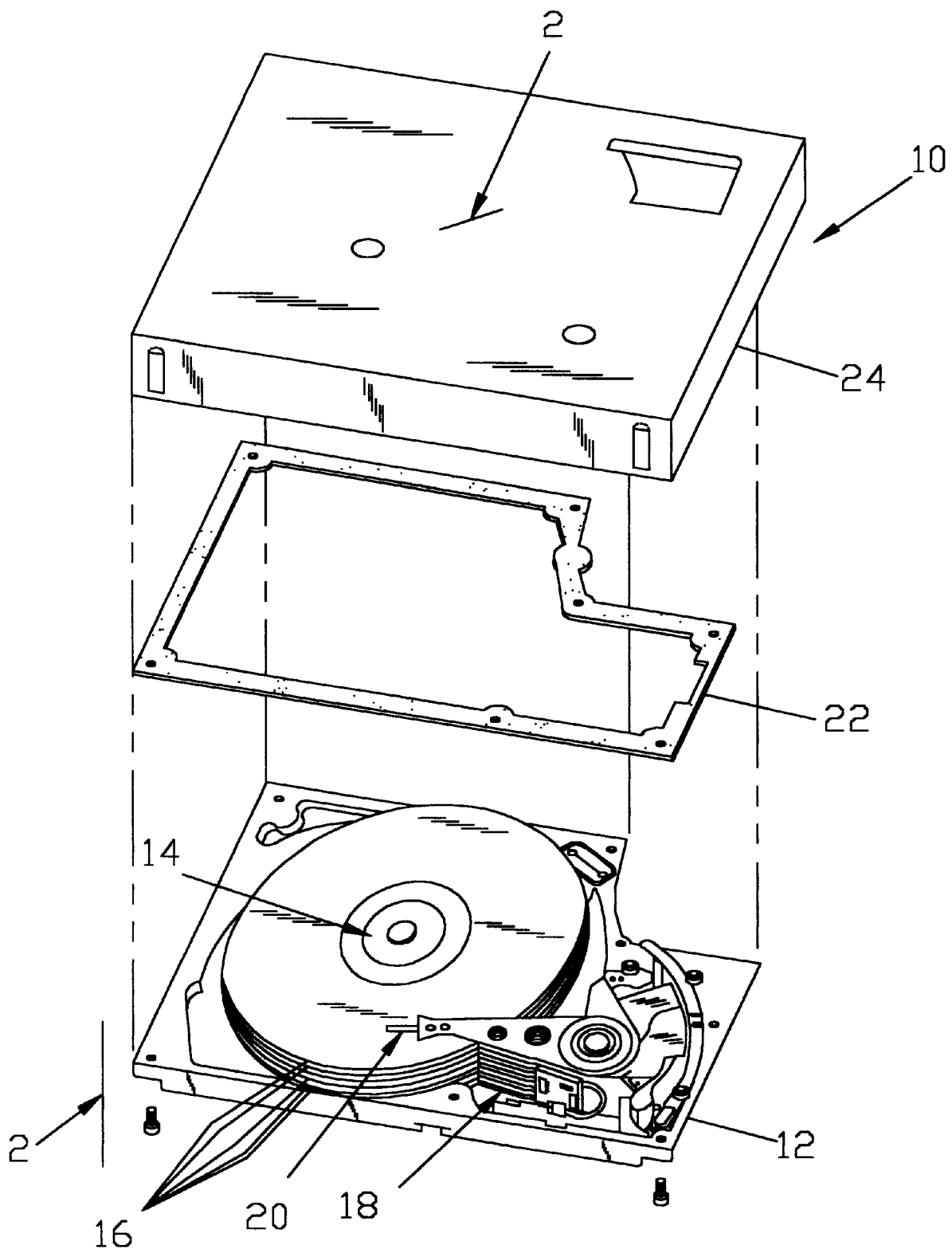
FIG. 1 is a plan view of a disc drive in which the present spindle motor is useful.

FIG. 1 is an exploded perspective view of a magnetic disc drive storage system in which the present motor could be used. However, clearly any motor using this plug connector is not limited to use with this particular design of a disc drive, nor is it indeed limited for use only in disc chives. Given the many advantages which this invention achieves, the connector would be particularly useful in any motor design which seeks the advantages of incorporating a connector plug into a hollow central shaft.

In this particular example of FIG. 1, the storage system 10 includes a housing base 12 having spindle motor 14 which carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a large number of radially differentiated tracks on the surface of the discs 16. This allows the transducers 20 to read and write magnetically encoded information on the surface of discs 16 at selected locations. The discs rotate at very high speeds, several thousand RPM, in order to maintain the transducers flying over the surface of the disc. Since this constant speed rotation is essential to the operation of the disc drive, it is absolutely essential that the spindle motor be reliable in operation while not susceptible to any deterioration or loss of electrical connections due to vibration or shock.

Figure 2:
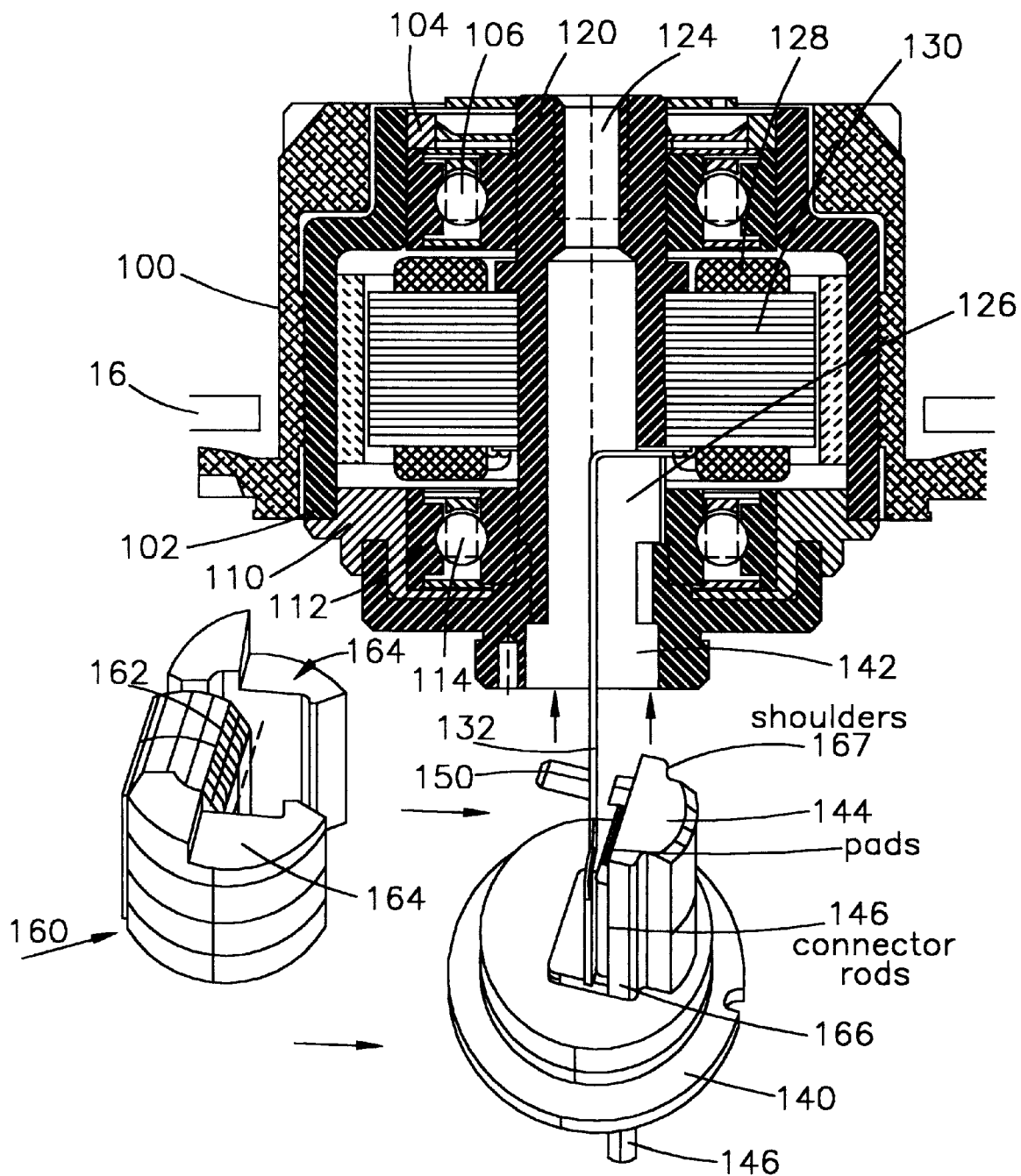
FIG. 2 is a vertical sectional view of a spindle motor designed in accordance with the present invention showing the salient features of a typical spindle motor in which the present invention is useful, and the two primary sections of the connector plug of the invention as well as the flexible printed circuit.

Referring next to FIG. 2, the figure shows the primary pieces of an exemplary motor in which the present invention is used, as well as the two major components of the press fit connector of this invention in an exploded form. The motor shaft 120 supports a hub 100 with a back iron 102; they are supported for rotation from the outer race 104 of upper bearing 106 and are further supported by the bearing holder 110 and outer race 112 of lower bearing 114. The figure further shows the hollow shaft 120 which may be either two-piece as shown or a single piece, and which supports the inner races 105 of the bearings on its outer surface 121. The shaft has a hollow center 124 which extends all or partway up through the shaft; a flexible printed circuit or its equivalent 126 passes up through the center of this hollow shaft and is connected to the windings 128 of the stator 130. The manner in which this connection is made is not relevant to this invention, and in fact the connections may be made either to the top or bottom of the windings. Further, although a flexible printed circuit is shown herein, other form of wiring may be brought out from the core and down to the flexible printed circuit 132 which is captured in the center of the connector which will now be described.

As appears in FIG. 2, the connector of this assembly comprises a base 140 which is of a size and shape to mate securely with the opening 142 which in this embodiment is in the base of the motor shaft 120. The base 140 supports a connector body 144 which supports on a relatively flat front surface thereof a number of connector rods, pads or pins or the like 146 which extend through the base 140 and out the bottom of the base as shown so that connections can be made electrically to external sources of power and/or control signals which will run through these pins and through the flexible printed circuit 132 to the stator coils 128. The connector body 144 also includes and supports from the front surface thereof a pin 150 which can be inserted through a hole in the flexible printed circuit 132 to aid in holding the flexible printed circuit in position in the connector. This pin also serves as a means for providing strain relief for the connector so that no undue stress or strain is imposed on the flexible printed circuit as it is captured inside the connector of this invention, making it less likely the flexible printed circuit can be pulled out of the connector. FIG. 2 also shows the connector/snap spring assembly 160 which will be explained in detail with respect to FIGS. 4A and 4B. Its essential function is to support a plurality of spring fingers 162 which press the flexible printed circuit 132 against the connector rods 146 so that solid electrical contact between the electrodes or contact pads printed on the front surface of the flexible printed circuit 132 maintain electrical contact with the connector rods 146. To hold the assembly together, snap arms 164 are provided on either side of the spring fingers 162 which snap over the shoulders 166, 167 of the connector body 144.

The succeeding figures show further details of some of the primary structural elements of the present invention. FIG. 3A shows the primary elements of the connector invention in disassembled form, including the flexible printed circuit 132 and the connector body 144 with the strain relief pin 150 shown aligned with the strain relief hole 152 through which it would be inserted. The connector rods or pins 146 also clearly appear in this figure; and reference to FIG. 3C shows the flexible printed circuit 132 with its printed electrodes (or contact pads) 170, 172, 174 which will be aligned with and pressed against the connector rod when the flexible printed circuit is incorporated into the assembled connector. The strain relief hole 152 also clearly appears in this figure, as well as the connections to the solder pads which are used to provide the necessary connections to the stator coils.

Figure 4A:
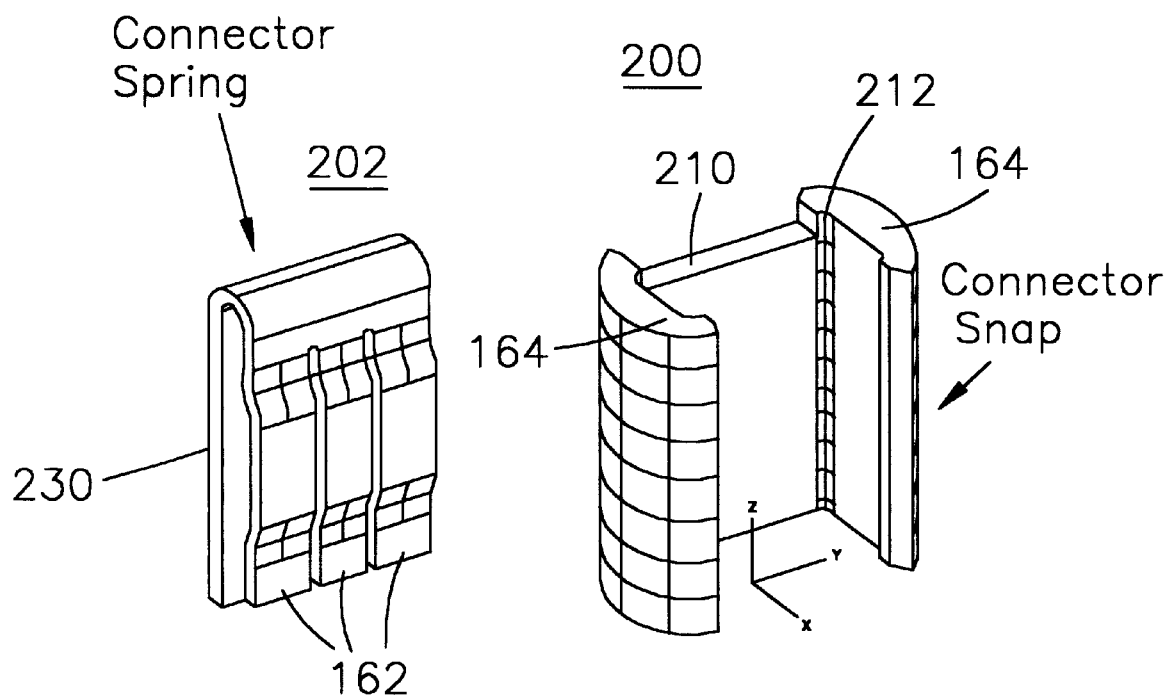
FIG. 4A shows the two sections of the connector snap spring assembly in perspective view separated.
Figure 4B:
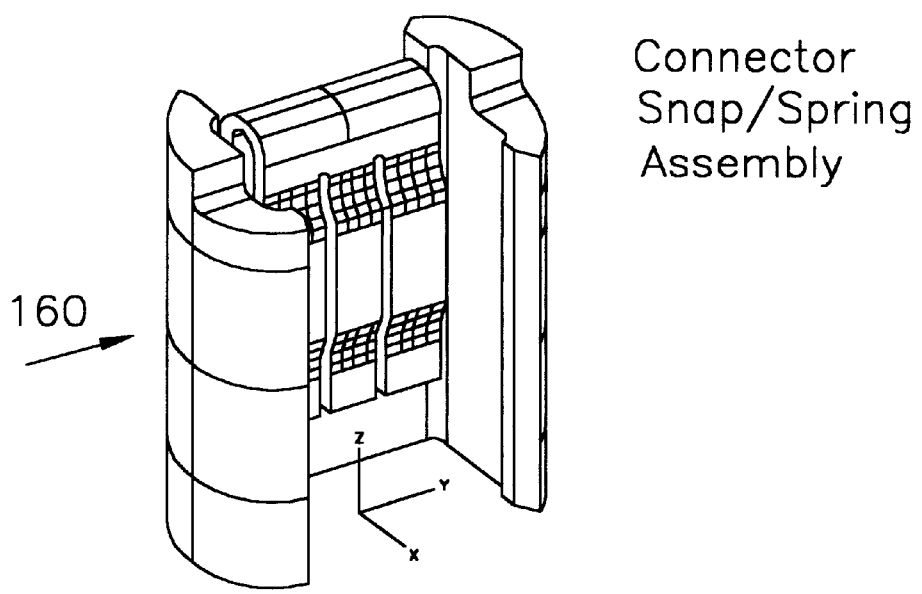
FIG. 4B shows the sections of the snap spring assembly assembled together.

The other two primary elements of this design are the connector snap 200 and the connector spring 202 which will be explained in detail with reference to FIGS. 4A and 4B. FIG. 4A shows the connector snap 200 in greater detail. It is termed a connector snap because the arms 164 snap over the shoulders 167 of the body to provide a means together with the connector spring 202 of tightly pressing the flexible printed circuit against the connector rods 146. Of course, the spring and snap combination could be fabricated as a single piece; however, such fabrication would be substantially more difficult using present-day techniques, especially in providing different flexible features. The connector snap comprises essentially a base or body portion 210 supporting the arms 164 which are intended to be somewhat flexible about the base 210 typically at the juncture 212 between the arms and base. The connector spring 202 has a back portion 230 supporting a set of flexible spring-like fingers 162 and has an opening of a sufficient width to allow the spring to be fitted over the base 210 of the snap 200 while the flexible printed circuit is already in place. By utilizing this two-piece construction, the fabrication of the device is substantially simpler. The parts are snapped together simply by pressing the spring 202 over the base 210 of the snap 200, forming the snap/spring assembly 160 which is shown in perspective form in FIG. 4B. This assembly 160 can then be snapped onto the connector body 144 while the flexible printed circuit is already in place, forming the integrated assembly 230 which appears in FIG. 3B. This completed assembly can then be inserted into the hollow shaft of the motor.

The inventive design introduces a flexible printed circuit for shaft center connector attachment which eliminates the need to feed individual wires through a slot or hole in the shaft. Further, the need to make any solder attachment has been eliminated by the press fit connection which is achieved herein. The assembly without solder allows for a much cleaner assembly process and easier installation. The many benefits of the present design include providing spring contacts which create the pressure between the flexible printed circuit and the connector rods 146 which are supported on the connector body 144 to ensure that even with any flexible printed circuit material change or movement over time, the electrical conductivity would be maintained. Further, since the flexible printed circuit is captured between the flexible fingers 162 and the face of the connector body 144 and rods 146, the spring force maintaining the electrical contact is independently of shaft bore size; therefore, no interference fit is needed in the present design between the shaft internal walls and the connector assembly. Further, the present design easily incorporates a strain relief along the flexible printed circuit during installation to prevent the flexible printed circuit from changing position and prevent it from being pulled out during product life.

Figure 5:
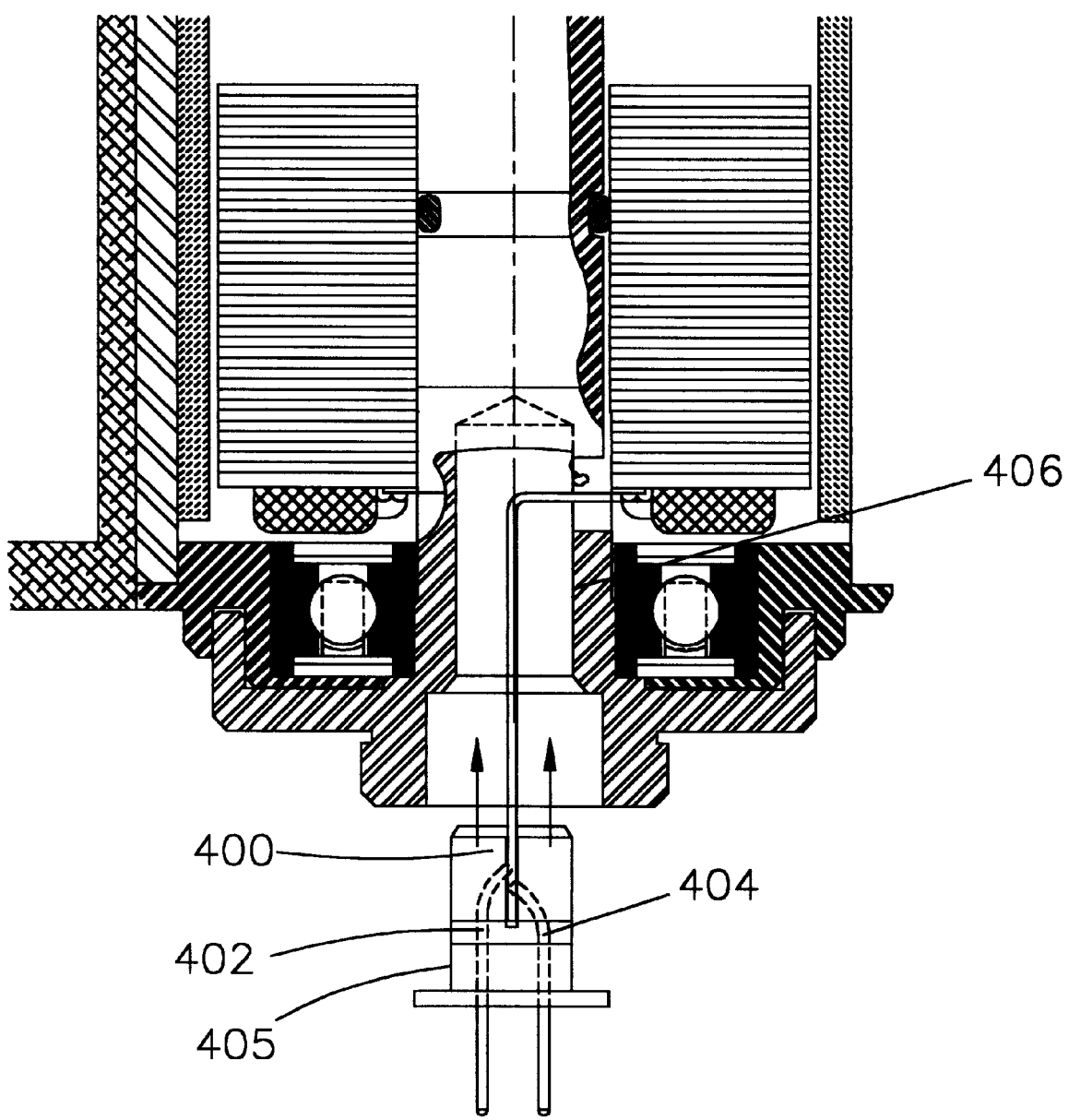
FIG. 5 is a vertical section view of a potential alternative embodiment of the invention.

Other features and advantages of the present invention may be apparent to a person of skill in the art who studies this disclosure. For example, referring to FIG. 5, which shows a motor of similar design using a flexible printed circuit where the printed circuit is simply inserted in a slot 400 in the connector body and bent pins 402, 404 of a number equal to the number of conductive strips on the flexible printed circuit are aligned with and pressed against these contacts. To maintain the tight electrical contact, some interference fit between the connector body and the walls 406 of the shaft bore and the outer wall 405 of the body would typically be necessary.

Other alternatives may appear to a person of skill in the art who studies the present invention disclosure. Therefore, the scope of the present invention is to be limited only by the following claims.

What is claimed is:

1. An improved flexible printed circuit connector for use in a motor having a hollow shaft comprising:
    a base adapted to be plugged into an opening in said hollow shaft;
    a body supported on said base and having a substantially flat face supporting connector rods which are electrically extended through said base to be available for electrical connections;
    a connector/snap spring assembly comprising a pair of arms adapted to snap over shoulders on said body and a one or more flexible springs adapted to be pressed against a flexible printed circuit which is inserted between said connector/snap spring assembly and said body and base portion so that electrical traces on a surface of said flexible printed circuit are pressed against said connector rods to firmly establish electrical connections between said flexible printed circuit and said electrical conductive rods;
    a pin supported from said face of said connector body and extending radially across the base of said body above said connector pads and adapted to be inserted through a hole in said flexible printed circuit to serve as a strain relief on said flexible printed circuit to prevent the circuit from being pulled out of the connector;
    wherein said connector/snap spring assembly includes said flexible fingers being equal in number to the number of connector rods on said face of said body so that said traces on said flexible printed circuit are tightly pressed against each of said connector rods; and
    a connector snap having flexible arms supported from a body and a connector spring having a back portion and a finger portion which are integrally formed and snapped axially over said body to form an integrated connector assembly with said springs being supported between said arms facing said connector rods on said body portion.

2. A disc drive spindle motor comprising:
    a central shaft adapted to be supported in a base of said disc drive,
    bearings mounted on said shaft and supporting a hub for rotation about said shaft, said hub supporting a magnet thereon,
    a stator supported on an external surface of said shaft;
    said shaft defining a hollow center extending to said base and at least partially up through said shaft;
    a cylindrical electrical connector inserted in said shaft comprising
        a base adapted to be plugged into an opening in said hollow shaft;
        a body supported on said base and having a substantially flat face supporting connector rods which are electrically extended through said base to be available for electrical connections;
        a connector/snap spring assembly comprising a pair of arms adapted to snap over shoulders on said base and a one or more flexible springs adapted to be pressed against a flexible printed circuit which is inserted between said connector/snap spring assembly and said body portion so that electrical traces on a surface of said flexible printed circuit are pressed against said connector rods to firmly establish electrical connections between said flexible printed circuit and said electrical conductive pads;
        a connector including a pin supported from said face of said connector body and extending radially from the face of said body above said connector rods and adapted to be inserted through a hole in said flexible printed circuit to serve as a strain relief on said flexible printed circuit to prevent the circuit from being pulled out of the connector;
        a connector wherein said snap spring assembly includes said flexible fingers being equal in number to the number of connector rods on said face of said body so that said traces on said flexible printed circuit are tightly pressed against each of said connector rods; and
        a connector snap having flexible arms supported from a body and a connector spring having a back portion and a finger portion which are integrally formed and snapped axially over said body to form an integrated connector assembly with said springs being supported between said arms facing said connector rods on said body portion.

* * * * *